United States Patent
Mishima

(10) Patent No.: US 6,220,932 B1
(45) Date of Patent: Apr. 24, 2001

(54) METHOD OF PRODUCING A DOUBLE-SIDED BELT STRUCTURE AND BELT STRUCTURE MADE ACCORDING TO THE METHOD

(75) Inventor: Kyoichi Mishima, Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/322,749

(22) Filed: May 28, 1999

(30) Foreign Application Priority Data

May 29, 1998 (JP) .................................................. 10-149148

(51) Int. Cl.⁷ ........................................................ B24B 1/00

(52) U.S. Cl. ............................................. 451/28; 451/188

(58) Field of Search ............................... 451/188, 51, 189, 451/246, 242, 545, 72, 28, 5

(56) References Cited

U.S. PATENT DOCUMENTS

| | | | |
|---|---|---|---|
| 5,214,881 * | 6/1993 | Borchardt | 451/188 |
| 5,549,510 * | 8/1996 | Fukuda et al. | 451/188 |
| 5,738,571 | 4/1998 | Kitahama et al. | |

FOREIGN PATENT DOCUMENTS 7124856A 5/1995 (JP) .

* cited by examiner

*Primary Examiner*—Derris H. Banks
(74) *Attorney, Agent, or Firm*—Wood, Phillips, VanSanten, Clark & Mortimer

(57) ABSTRACT

A method of producing a double-sided belt structure from an endless body having a length, a first surface, a second surface, at least one load carrying cord embedded in the body with a lengthwise center and extending along the length of the body between the first and second surfaces of the body, and a thickness between the first and second surfaces of the body. The method includes the steps of moving the body in a controlled endless path around at least a first pulley with the second surface of the body outside of the first surface of the body; while the body is moving in the endless path, a) predetermining a center position of the center of at least one load carrying cord between the first and second surfaces of the body, b) determining a grinding value for the first surface of the body based on the center position of the center of the at least one load carrying cord, and c) determining a grinding value for the second surface of the body based on the center position of the center of the at least one load carrying cord; grinding the second surface of the body based upon the determined grinding value for the second surface of the body; and grinding the first surface of the body based upon the determined grinding value for the first surface of the body.

19 Claims, 3 Drawing Sheets

METHOD OF PRODUCING A DOUBLE-SIDED BELT STRUCTURE AND BELT STRUCTURE MADE ACCORDING TO THE METHOD

BACKGROUND OF THE INVENTION

1. Field of the Invention

This invention relates to power transmission belts and, more particularly, to a method of producing a double-sided power transmission belt, or belt sleeve from which one or more power transmission belts can be formed, having at least one load carrying cord embedded therein. The invention is also directed to a double-sided power transmission belt or belt sleeve made according to the method.

2. Background Art

One known manner of forming double-sided, ribbed belts is shown in JP-A7-124856. There is disclosed therein a belt sleeve, having a load carrying cord embedded in a cushion rubber layer, trained around pulleys having the same diameter. Multiple ribs, with grooves therebetween, are formed by a grinding wheel on one surface of the belt sleeve as it is moved around the pulleys. The belt sleeve is then turned inside out and again trained around the pulleys to form, through the grinding wheel, ribs, and grooves therebetween, on the other side of the sleeve. To prevent lateral shifting of the belt sleeve during formation of the ribs on the other side, it is known to use a cartridge, on one or both of the pulleys, with a shape complementary to the ribs and grooves formed on the one side of the belt sleeve. This permits an accurate, desired, lateral alignment between the ribs on the opposite surfaces of the belt sleeve to be established.

In a conventional forming process, the belt sleeve is ground on opposite sides without consideration of the position of the load carrying cords and a possible discrepancy in the location of the load carrying cords from that intended between the inside and outside of the belt sleeve. While accurate lateral alignment between the ribs on the oppositely facing surfaces may be established, the load carrying cords in the resulting belt may be closer to one surface than the other, rather than precisely centered therebetween as intended. This condition may cause an appreciable variation in operating characteristics with the belt operated in normal and reverse rotational modes. The pulley outer circumference (POC) may vary with the belt trained around a pair of pulleys and rotated thereabout. As a result, the desired rotational ratio between pulleys on which the belt is mounted may vary significantly.

SUMMARY OF THE INVENTION

The invention is directed to a method of producing a double-sided belt structure from an endless body having a length, a first surface, a second surface, at least one load carrying cord embedded in the body with a lengthwise center and extending along the length of the body between the first and second surfaces of the body, and a thickness between the first and second surfaces of the body. The method includes the steps of moving the body in a controlled endless path around at least a first pulley with the second surface of the body outside of the first surface of the body; while the body is moving in the endless path, a) predetermining a center position of the center of at least one load carrying cord between the first and second surfaces of the body, b) determining a grinding value for the first surface of the body based on the center position of the center of the at least one load carrying cord, and c) determining a grinding value for the second surface of the body based on the center position of the center of the at least one load carrying cord; grinding the second surface of the body based upon the determined grinding value for the second surface of the body; and grinding the first surface of the body based upon the determined grinding value for the first surface of the body.

It is one objective of the present invention to allow accurate location of the at least one load carrying cord between the oppositely facing surfaces of a belt structure between which the belt thickness is defined. In the event that the load carrying cord is inadvertently located closer to one surface of the belt sleeve than the other, an accommodation can be made so that the resulting belt structure has the desired relationship between the at least one load carrying cord and the oppositely facing surfaces of the belt structure.

The step of moving the body in a controlled path around at least a first pulley may involve moving the body in the controlled path around the first pulley and a second pulley, having a diameter that is different than the diameter of the first pulley, through rotation of the first and second pulleys.

The second surface may be ground to form one rib or a plurality of ribs.

The first surface may be ground to form one rib or a plurality of ribs.

The step of determining the grinding values for the first and second surfaces may involve determining the grinding values so that the center of the at least one load carrying cord is spaced equally from free end surfaces of the ribs on the first and second sides of the belt structure.

The step of predetermining a center position of the center of the at least one load carrying cord may involve predetermining a center position of the center of the at least one load carrying cord based on a ratio of rotational velocities of the first and second pulleys.

The step of determining a grinding value (y1) for the second surface may involve determining a grinding value according to the following equation:

$$y1 = 2w - (\alpha + \beta)$$

where:

a) 2w is the thickness of the body before grinding;
b) $\alpha$ is the center position of the center of the at least one load carrying cord; and
c) $2\beta$ is the thickness of the double-sided belt product.

The step of determining a grinding value (y2) for the first surface may involve determining a grinding value for the first surface according to the following equation:

$$y2 = \alpha - \beta$$

where:

a) $\alpha$ is the center position of the center of the at least one load carrying cord; and
b) $\beta$ is equal to ½ the thickness of the double-sided belt product.

The step of predetermining a center position ($\alpha$) of the center of the at least one load carrying cord may involve predetermining a center position of the center of the at least one load carrying cord according to the following equation:

$$\alpha = (\omega 1 \cdot A - \omega 2 \cdot B)/[2 \cdot (\omega 2 - \omega 1)]$$

where:

a) A is the diameter of the first pulley;
b) B is the diameter of the second pulley that is less than the diameter of the first pulley;
c) $\omega 2$ is the rotational velocity of the first pulley; and
d) $\omega 1$ is the rotational velocity of the second pulley.

The method may include the step of moving the body in a controlled endless path around a pulley with the first surface of the body outside of the second surface of the body while grinding the first surface of the body.

The method may involve removing foreign material from the body as at least one of the first and second surfaces of the body is ground.

The foreign material may be removed by brushing the body and/or by generating vacuum adjacent to the body to draw foreign material away from the body.

The method may include the step of sensing the rotational velocities of the first and second pulleys and producing a signal indicative of the rotational velocities of the first and second pulleys. The step of determining the grinding value for the second surface of the body may involve processing the signal through a controller to determine the grinding value for the second surface.

The method may include controlling a grinding element that grinds the second surface through the controller.

The method may further include the step of causing the controller to automatically stop grinding of the second surface once the grinding reaches the grinding value for the second surface.

The invention may further include the step of causing the controller to initiate operation of at least one of a brush and a vacuum source to remove foreign material from the body as at least one of the first and second surfaces is ground.

The invention is also directed to a double-sided belt structure made according to the above method. The double-sided belt structure may be a power transmission belt or a belt sleeve from which one or a plurality of power transmission belts can be formed.

The invention is also directed to a double-sided belt structure having an endless body with a length, a first surface, a second surface, at least one load carrying cord embedded in the body with a lengthwise center and extending along the length of the body between the first and second surfaces of the body, and a thickness between the first and second surfaces of the body. The first and second surfaces of the body are controllably ground by a) predetermining a center position of the center of the at least one load carrying cord, b) determining a grinding value for the first surface based on the center position of the center of the at least one load carrying cord, c) determining a grinding value for the second surface based on the center position of the center of the at least one load carrying cord, and d) grinding both the first and second surfaces based on the first and second grinding values.

The double-sided belt structure may have a plurality of ribs formed on each of the first and second surfaces with there being grooves between adjacent ribs.

DETAILED DESCRIPTION OF THE DRAWINGS

Figure 1:
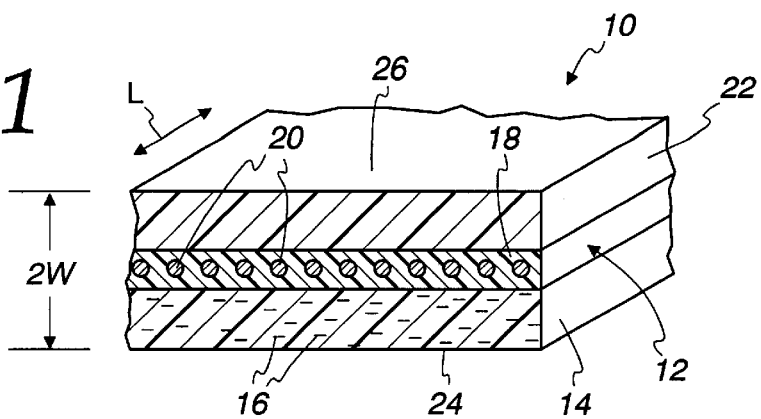
FIG. 1 is a fragmentary, cross-sectional, perspective view of a belt sleeve that can be processed, according to the present invention.

In FIG. 1, a belt sleeve is shown at 10, of the type useable to practice the inventive method. The belt sleeve 10 has a body 12 which is formed into an endless, cylindrical shape with a length indicated by the double-headed arrow L. The belt sleeve 10, as shown, is conventionally formed by successively building components on a cylindrical forming drum (not shown). Other ways of forming the belt sleeve 10 are also contemplated.

In the embodiment shown, the body 12 consists of a first rubber layer 14, which may have short, reinforcing fibers 16 embedded therein, with the lengths thereof extending generally in a lateral direction (i.e. left to right in FIG. 1). The fibers 16 may be aramid fibers, or other suitable types of fibers known to those skilled in the art. A cushion rubber layer 18 is wrapped over the rubber layer 14. One or more load carrying cords 20 are wrapped spirally around the cushion rubber layer 18. The last applied component is a rubber layer 22. The overall thickness between a first surface 24 and a second surface 26 is identified as 2w. The belt sleeve 10 can be vulcanized in a conventional manner.

Figure 2:
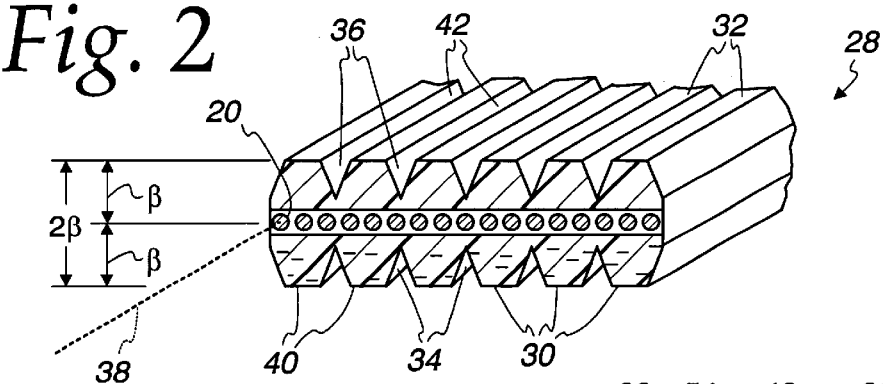
FIG. 2 is a fragmentary, cross-sectional, perspective view of a double-sided belt structure produced from the belt sleeve in FIG. 1, according to the present invention.

The invention is directed to the production of a double-sided belt structure, as shown at 28 in FIG. 2, from the belt sleeve 10 of FIG. 1. In this embodiment, the belt structure 28 has a plurality of ribs 30 formed at the first surface 24 and a plurality of ribs 32 formed at the second surface 26. Grooves 34 are formed between adjacent ribs 30, with grooves 36 formed between adjacent ribs 32. At least one load carrying cord 20 has a lengthwise center 38 which is, in this construction, spaced equidistantly from both the free ends 40 of the ribs 30 and the free ends 42 of the ribs 32. In the embodiment shown, each of these distances is identified as $\beta$ with the combined distances, i.e. the thickness of the belt structure 28, being $2\beta$.

It should be understood that the components of the belt sleeve 10 and resulting belt structure 28 could be different from those shown. The invention can also be practiced to form a single rib at each surface 24, 26 or a structure without ribs at the first and second surfaces 24, 26.

Figure 3:
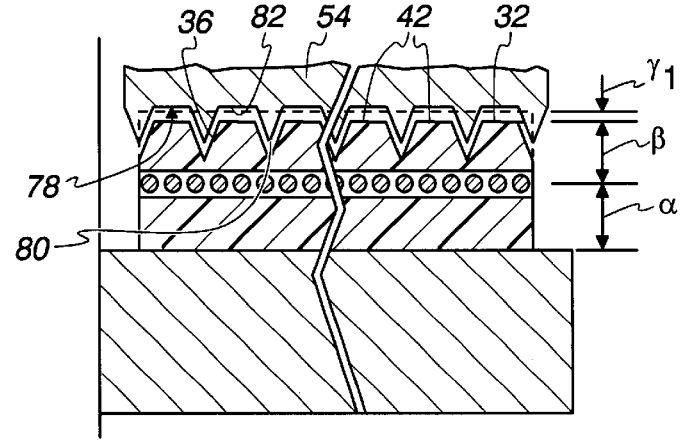
FIG. 3 is a cross-sectional view of the belt sleeve of FIG. 1 extended around a pulley and in operative relationship with a grinding element, with the grinding element having formed a plurality of ribs on one surface thereof and with the other surface unprocessed.
Figure 4:
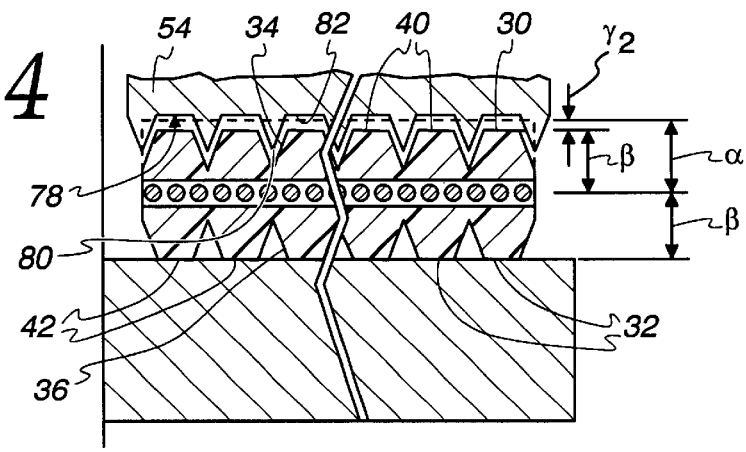
FIG. 4 is a view as in FIG. 3 with the belt sleeve turned inside out and the grinding element having formed a plurality of ribs on the other surface of the belt sleeve.

According to the invention, and as seen in FIGS. 2–4, the center position ($\alpha$) of the center 38 of the at least one load carrying cord 20 is predetermined. The grinding value y1 for the second surface 26 is determined so that the second surface 26 can be ground to produce the dimension $\beta$ between the center 38 and the free ends 42 of the ribs 32. Similarly, the grinding value y2 for the first surface 24 is determined so that the first surface 24 can be ground to produce the dimension $\beta$ between the center 38 and the free ends 40 of the ribs 30. This allows centering of the at least one load carrying cord 20 between the free ends 40, 42. It should be understood that the inventive method can be practiced to controllably situate at least one load carrying cord 20 at any desired location between the free ends 40, 42 of the ribs 30, 32.

Figure 5:
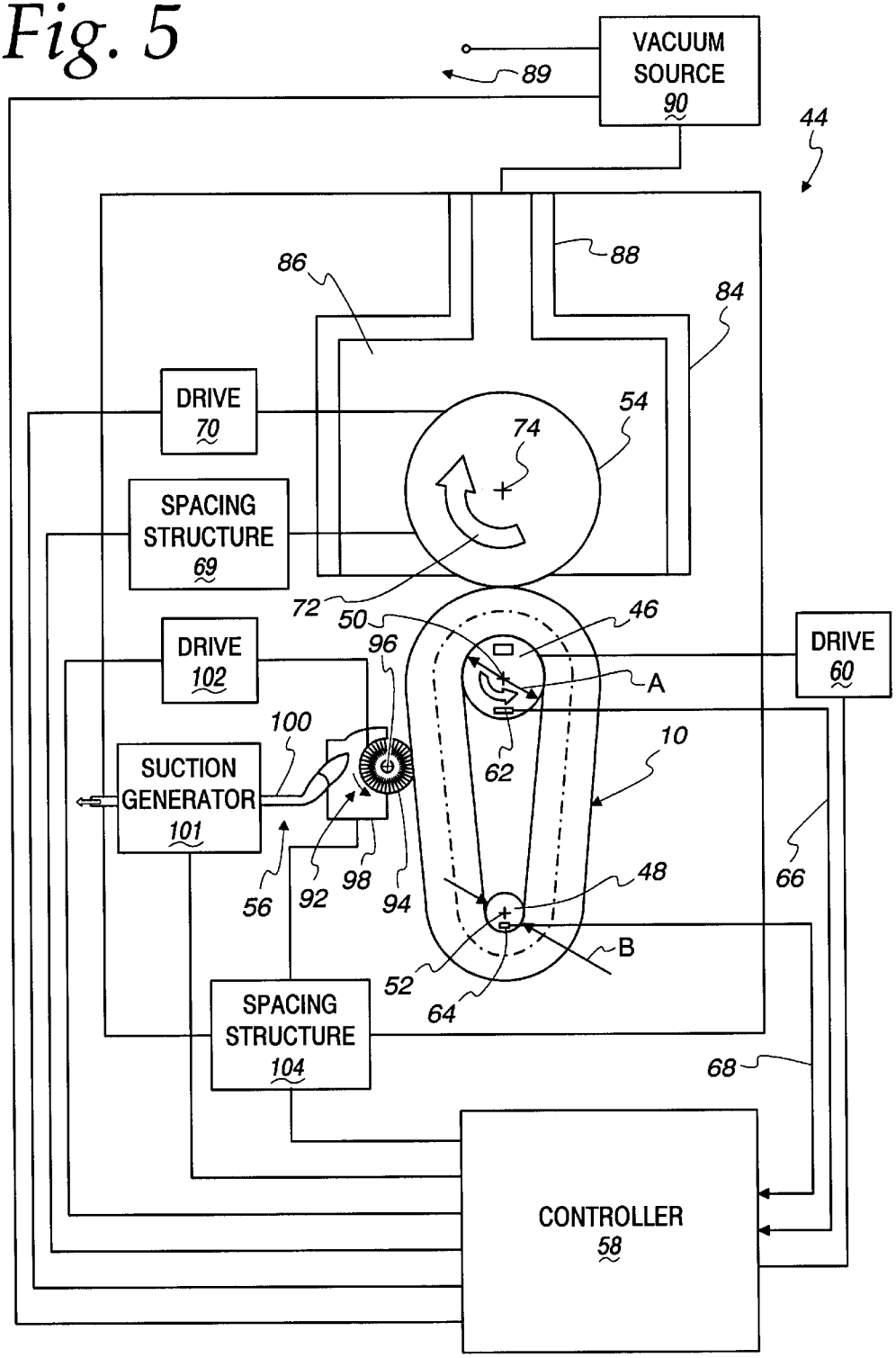
FIG. 5 is a schematic representation of an apparatus for producing a double-sided belt structure, according to the present invention.
Figure 6:
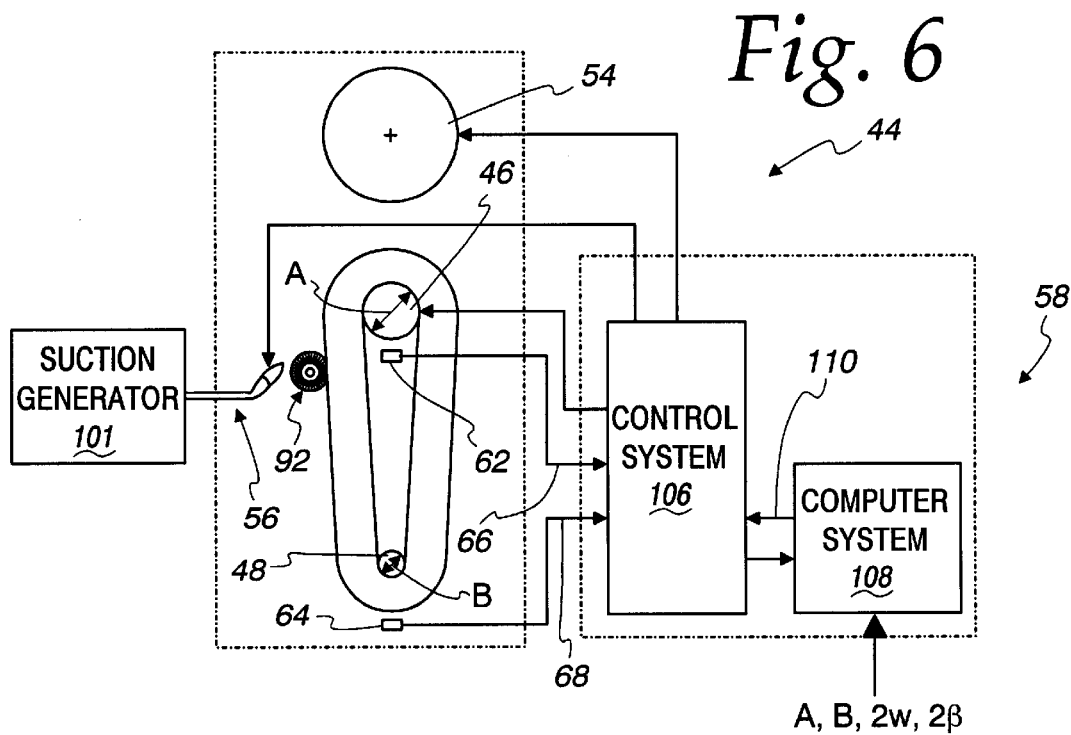
FIG. 6 is a schematic representation of a system for producing a double-sided belt structure, according to the present invention, including a controller for automatically coordinating operation of the apparatus.

To carry out the inventive method, an apparatus, as shown at 44 in FIGS. 5 and 6, can be utilized. The apparatus 44 consists of a driving pulley 46, having a diameter A, and a driven pulley 48, having a diameter B. The pulleys 46, 48 are arranged to rotate around parallel axes 50, 52, respectively. The diameter A is greater than the diameter B. While the elements 46, 48 are characterized as "pulleys", they could have any construction which allows an endless element to be wrapped therearound and controllably moved in an endless path. For example, the elements 46, 48 could be cylindrical with a flat outer surface, a ribbed surface, or other configuration. The elements 46, 48 could be designed to accommodate a cartridge, to allow keying to a belt structure, as in the prior art and described above.

Figure 7:
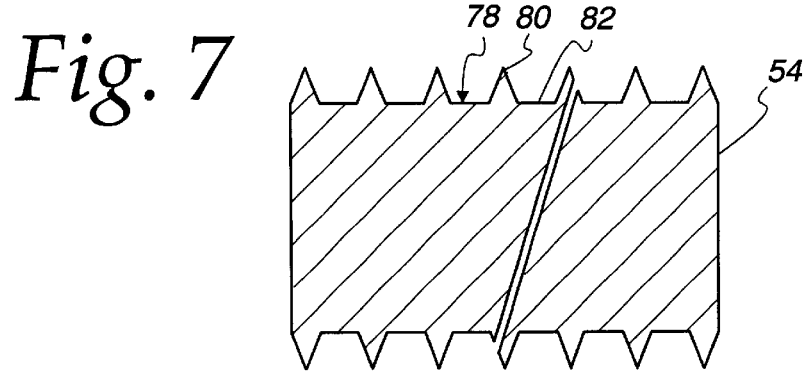
FIG. 7 is a cross-sectional view of the grinding element, shown in FIGS. 3 and 4.

A grinding wheel 54, as shown in FIGS. 3, 4 and 7, is situated to operate upon the belt sleeve 10 as it moves in an endless path around the pulleys 46, 48. The grinding wheel 54, as described hereinafter, is designed to form the ribs 30, 32 and grooves 34, 36, as shown in FIGS. 2–4. The invention is not limited to rib and groove formation by a grinding wheel. Any other forming mechanism, known to those in the art, could be used to produce the invention.

A suction system at 56 draws powder, removed from the belt sleeve 10 by the grinding wheel 54, and any other foreign material, from the belt sleeve 10 during processing thereof. The suction system 56 is controlled by a controller 58, as shown in FIG. 6, and hereinafter described in greater detail.

The driving pulley 46 is driven by a drive 60 around the axis 50, thereby causing the belt sleeve 10 to move in an endless path around the pulleys 46, 48. The rotational velocity (ω) of the driving and driven pulleys 46, 48 is detected by sensors 62, 64, associated one each with the driving and driven pulleys 46, 48. The sensors 62, 64 may be rotary encoders which produce signals 66, 68, indicative of the rotational velocities (ω) of the pulleys 46, 48, to the controller 58. The rotational velocity (ω2) for the pulley 46 is greater than the rotational velocity (ω1) for the pulley 48 due to the difference in diameter thereof.

The grinding wheel 54 is designed to move selectively towards and away from the driving pulley 46, and thus the belt sleeve 10 trained therearound, by operation of a spacing structure 69. The grinding wheel 54 is rotated by a drive 70 in the direction of the arrow 72 around a central axis 74. Operation of the drive 70 and spacing structure 69 is dictated by the controller 58.

As seen in FIGS. 3, 4, and 7, the grinding wheel 54 has a peripheral surface 78 with V-shaped projections 80, spaced axially therealong, to form the grooves 34, 36. The region 82 between adjacent projections 80 is complementary to the shape of the ribs 30, 32 on the belt structure 28.

As seen in FIG. 5, a cover 84 is provided over the grinding wheel 54. A chamber 86, bounded by the cover 84, communicates through a duct 88 to a collection area 89. A vacuum source 90 may be employed to draw powder and other foreign material within the chamber 86 through the duct 88 for appropriate collection and disposal.

A brush assembly at 92 may be used in conjunction with the suction system 56. The brush assembly 92 consists of a cylindrical brush element 94 which is rotatable about an axis 96 that is generally parallel to the axes 50, 52. The brush element 94 acts against the moving belt sleeve 10 to dislodge ground powder and other foreign material from the belt sleeve 10. In this embodiment, the brush element 94 resides within a shroud 98 within which vacuum through the suction system 56 is generated. The suction system 56 draws the ground powder and other foreign material through a duct 100 for appropriate disposal. A suction generator 101 and a drive 102 for the brush element 94 are both operated by the controller 58. A spacing structure 104, which controls the position of the brush element 94 and shroud 98 relative to the belt sleeve 10, is likewise operated by the controller 58.

As shown in FIG. 6, the controller 58 includes a control system 106 for operation of a) the drive 60 on the driving pulley 46, b) the drive 70 and spacing structure 69 for the grinding wheel 54, and c) the suction generator 101. The controller 58 further includes a computing system 108 which computes the central position (α) of the center 38 of the at least one load carrying cord 20, and the grinding values y1 and y2 using the signals 66, 68 from the sensors 62, 64, based on the rotational velocity of the driving pulley 46 and driven pulley 48. The controller 58 controls the drive 60 for the driving roller 46 and the operation of the suction system 56 based on instructions inputted by an operator. Control of the drive 70 and spacing structure 69 for the grinding wheel 54 is dictated by the grinding values y1, y2, as computed by the computing system 108.

Figure 8:
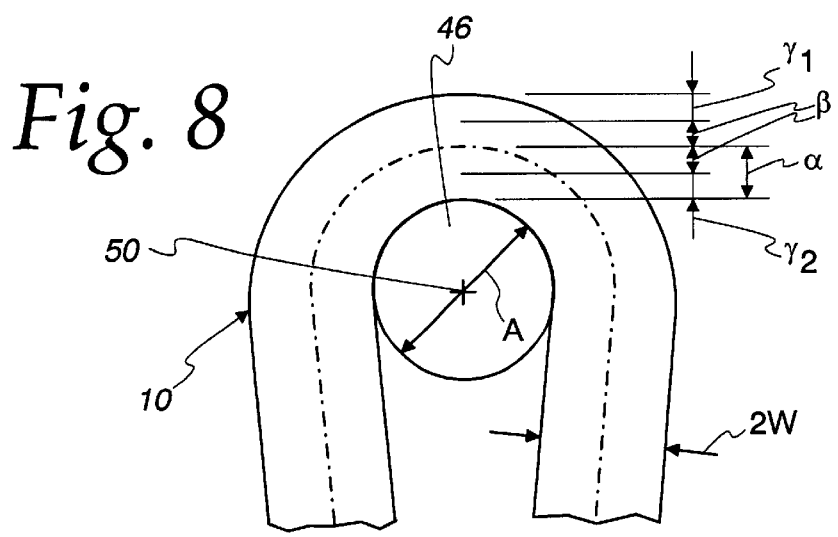
FIG. 8 is a schematic, fragmentary view of a belt sleeve wrapped around a pulley and depicting dimensions, some of which can be predetermined and others of which are calculated, to controllably produce a double-sided belt structure, according to the present invention.

The operator inputs to the computing system 108: a) the diameters A and B of the driving pulley 46 and driven pulley 48; b) the thickness 2w of the belt sleeve 10, as shown in FIG. 1; and c) the desired end thickness 2β of the belt structure 28. The rotational velocities ω1, ω2 are inputted through the sensor signals 66, 68. The computing system 108 determines the center position (α) of the center 38 of the at least one load carrying cord 20 (i.e. any deviation of the center 38 of the at least one load carrying cord 20 from the center of the belt sleeve thickness) and calculates the grinding values y1 and y2 based on the values ω1, ω2, A, B, 2w, and 2β, as seen in FIG. 8.

The center position (α) of the center 38 of the at least one load carrying cord 20 is obtained based on the rotational ratio (i) of the pulleys 46, 48, which is as follows:

$i=(\omega 1/\omega 2)=(A+2\alpha)/(B+2\alpha)$. From this formula, α is calculated and is as follows:

$\alpha=(\omega 1 \cdot A - \omega 2 \cdot B)/[2 \cdot (\omega 2 - \omega 1)]$.

As seen in FIG. 8, the center position a of the center 38 of the at least one load carrying cord 20 is determined. Based on the center position (α), the grinding values y1 and y2 for each of the surfaces 24, 26 can be determined. The grinding value y1 has ½ the thickness 13 of the overall thickness 2β from the center 38, and is determined as follows:

$y1=2w-(\alpha+\beta)$.

The grinding value y2 is obtained according to the following equation:

$y2=\alpha-\beta$.

Once the computing system 108 determines the grinding values y1, y2, an appropriate signal 110 is sent to the control system 106. The controller 58, through the control system 106, then appropriately controls the operation of the drive 70 and spacing structure 69 on the grinding wheel 54 to produce the belt structure 28 shown in FIG. 2, by grinding the surfaces 24, 26 based upon the grinding values y1 and y2. Once the surfaces 24, 26 are ground according to the grinding values y1 and y2, the controller 58 stops the grinding operations.

The overall process will now be described. After forming and vulcanizing the belt sleeve 10, the belt sleeve 10 is trained around the driving pulley 46 and driven pulley 48. The controller 58 is programmed to operate the drive 60 to cause the belt sleeve 10 to move in an endless path around the pulleys 46, 48. At operating speed, the sensors 62, 64 produce signals 66, 68 indicative of the rotational velocity of the pulleys 46, 48, and send the signals 66, 68 to the controller 58. Through those signals 66, 68, the computing system 108 predetermines the center position ($\alpha$) of the center 38 based on the following formula, which utilizes the detected rotational velocities $\omega 1$ and $\omega 2$ and the inputted values A, B, 2w and 2$\beta$.

$$\alpha = (\omega 1 \cdot A - \omega 2 \cdot B)/[2 \cdot (\omega 2 - \omega 1)]$$

The grinding values y1 and y2 are then determined from the following formulas and supplied to the control system 106.

$$y1 = 2w - (\alpha + \beta)$$

$$y2 = \alpha - \beta$$

The control system 106, with the inputted grinding values y1 and y2, controls the operation of the grinding wheel 54 to continuously form the surface 26 based upon the grinding value y1 and the surface 24 based upon the value y2. The resulting belt structure 28 has a thickness with first and second surfaces spaced equally, and a distance $\beta$, from the center 38.

The control system 106 further operates the suction generator 101, drive 102, and spacing structure 104 simultaneously with operation of the drive 70, spacing structure 69, and vacuum source 90, associated with the grinding wheel 54, to thereby brush ground powder and other foreign material off of the belt sleeve 10 and draw and deliver the powder and foreign material to an appropriate discharge location.

At the completion of the grinding operation on the surface 26, the belt sleeve 10 is removed from the pulleys 46, 48 and turned inside out and mounted in the inside-out state around the driving pulley 46 and driven pulley 48 to be guided thereby in an endless path. The control system 106 dictates operation of the drive 70, spacing structure 69, and vacuum source 90 to form the belt surface 24, based upon the grinding value y2.

At the completion of the grinding operation on both surfaces 24, 26, the control system 106 operates the spacing structure 69 to separate the grinding wheel 54 from the belt structure 28. The belt structure 28 can then be removed from the pulleys 46, 48 and cut into individual belts having a desired width.

It should be understood that the inventive process could also be practiced to form individual belts as opposed to forming a belt sleeve 10 and then cutting individual belts from the sleeve 10.

The performance of a belt, made according to the present invention, will now be compared to a double-ribbed belt made by conventional methods, based on dynamic testing. Each of the inventive and prior art belts was trained around a pair of pulleys and the POC values measured. The degree of displacement of the load carrying cords from the center of the belt was measured for normal rotation and reverse rotation. Each belt had a thickness of 6.3 mm, a rib height of 2 mm, and an outer peripheral surface (POC) of 1,195 mm.

The results of the test are shown in Table 1, below:

TABLE 1

| | Results | | | |
|---|---|---|---|---|
| Method | POC at normal rotation | POC at reverse rotation | Difference between normal rotation and reverse rotation (error) | Discrepancy of center of load carrying cord |
| Prior Art Belt | 1196.2 mm | 1192.1 mm | 4.1 mm | 0.33 mm |
| Inventive Belt | 1195.1 mm | 1195.3 mm | 0.2 mm | 0.02 mm |

The error resulting between normal and reverse rotation for the inventive belt was 0.2 mm, which is significantly better than the 4.1 mm error for the prior art belt. This resulted from the deviation of the center of the load carrying cords from the belt center, which was 0.02 mm for the inventive belt, as compared to 0.33 mm for the prior art belt. The load carrying cord in the inventive belt was close to center.

The relationship of the deviation of the load carrying cord from center and a difference ($\epsilon$) between the outer peripheral surface lengths (POC), between normal and reverse rotation, is as follows:

$\epsilon = 4 \cdot \Pi \cdot a$ (where $\Pi$ is a circular constant, and

"a" is a deviation of the load carrying cord from center).

The foregoing disclosure of specific embodiments is intended to be illustrative of the broad concepts comprehended by the invention.

What is claimed is:

1. A method of producing a double-sided belt structure from an endless body having a length, a first surface, a second surface, at least one load carrying cord embedded in the body with a lengthwise center and extending along the length of the body between the first and second surfaces of the body, and a thickness between the first and second surfaces of the body, the method comprising the steps of:

moving the body in a controlled endless path around at least a first pulley with the second surface of the body outside of the first surface of the body;

while the body is moving in the endless path, a) predetermining a center position of the center of the at least one load carrying cord between the first and second surfaces of the body, b) determining a grinding value for the first surface of the body based on the center position of the center of the at least one load carrying cord, and c) determining a grinding value for the second surface of the body based on the center position of the center of the at least one load carrying cord;

grinding the second surface of the body based upon the determined grinding value for the second surface of the body; and grinding the first surface of the body based upon the determined grinding value of the first surface of the body.

2. The method of producing a double-sided belt structure according to claim 1 wherein the step of moving the body in the controlled path around at least the first pulley comprises moving the body in the controlled path around the first pulley and a second pulley having a diameter that is different than the diameter of the first pulley through rotation of the first and second pulleys.

3. The method of producing a double-sided belt structure according to claim 2 wherein the step of predetermining a center position of the center of the at least one load carrying cord comprises predetermining a center position of the center of the at least one load carrying cord based on a ratio of rotational velocities of the first and second pulleys.

4. The method of producing a double-sided belt structure according to claim 3 wherein the step of determining a grinding value (y2) for the second surface comprises determining a grinding value for the second surface according to the following equation:

$$y1=2w-(\alpha+\beta)$$

where:
a) 2w is the thickness of the body before grinding;
b) $\alpha$ is the center position of the center of the at least one load carrying cord; and
c) 2$\beta$ is the thickness of the double-sided belt product.

5. The method of producing a double-sided belt structure according to claim 3 wherein the step of determining a grinding value (y2) for the first surface comprises determining a grinding value for the first surface according to the following equation:

$$y2=\alpha-\beta$$

where:
a) $\alpha$ is the center position of the center of the at least one load carrying cord; and
b) $\beta$ is equal to ½ the thickness of the double-sided belt product.

6. The method of producing a double-sided belt structure according to claim 3 wherein the step of predetermining a center position ($\alpha$) of the center of the at least one load carrying cord comprises predetermining the center position of the center of the at least one load carrying cord according to the following equation:

$$\alpha=(\omega 1 \cdot A - \omega 2 \cdot B)/[2\cdot(\omega 2-\omega 1)]$$

where:
a) A is the diameter of the first pulley;
b) B is the diameter of the second pulley that is less than the diameter A of the first pulley;
c) $\omega 2$ is the rotational velocity of the first pulley; and
d) $\omega 1$ is the rotational velocity of the second pulley.

7. The method of producing a double-sided belt structure according to claim 3 including the step of sensing the rotational velocities of the first and second pulleys and producing a signal indicative of the rotational velocities of the first and second pulleys and the step of determining the grinding value for the second surface of the body comprises processing the signal through a controller to determine the grinding value for the second surface.

8. The method of producing a double-sided belt structure according to claim 7 including the step of controlling a grinding element that grinds the second surface through the controller.

9. The method of producing a double-sided belt structure according to claim 8 including the step of causing the controller to automatically stop grinding of the second surface once the grinding reaches the grinding value for the second surface.

10. The method of producing a double-sided belt structure according to claim 7 including the step of causing the controller to initiate operation of at least one of a brush and a vacuum source to remove foreign material from the body as at least one of the first and second surfaces is ground.

11. The method of producing a double-sided belt structure according to claim 1 wherein the step of grinding the second surface comprises grinding the second surface so as to form at least one rib.

12. The method of producing a double-sided belt structure according to claim 11 wherein the step of grinding the first surface comprises grinding the first surface so as to form at least one rib.

13. The method of producing a double-sided belt structure according to claim 1 wherein the step of grinding the second surface comprises grinding the second surface so as to form a first plurality of ribs with free end surfaces and a groove between adjacent ribs.

14. The method of producing a double-sided belt structure according to claim 13 wherein the step of grinding the first surface comprises grinding the first surface so as to form a second plurality of ribs with free end surfaces and a groove between adjacent ribs.

15. The method of producing a double-sided belt structure according to claim 14 wherein the step of determining the grinding values for the first and second surfaces comprises determining the grinding values so that the center of the at least one load carrying cord is spaced equally from the free end surfaces of the first and second plurality of ribs.

16. The method of producing a double-sided belt structure according to claim 1 including the step of moving the body in a controlled endless path around a pulley with the first surface of the body outside of the second surface of the body while grinding the first surface of the body.

17. The method of producing a double-sided belt structure according to claim 1 including the step of removing foreign material from the body as at least one of the first and second surfaces of the body is ground.

18. The method of producing a double-sided belt structure according to claim 17 wherein the step of removing foreign material from the body comprises the step of brushing the body.

19. The method of producing a double-sided belt structure according to claim 17 wherein the step of removing foreign material from the body comprises the step of generating vacuum adjacent to the body to draw foreign material away from the body.

* * * * *